(12) United States Patent
Brooke

(10) Patent No.: US 7,311,823 B2
(45) Date of Patent: Dec. 25, 2007

(54) POOL FILTER CLEANING DEVICE

(76) Inventor: Richard Brooke, 218 Sweetwater Creek Dr. E., Longwood, FL (US) 32779

( * ) Notice: Subject to any disclaimer, the term of this patent is extended or adjusted under 35 U.S.C. 154(b) by 421 days.

(21) Appl. No.: 10/947,834

(22) Filed: Sep. 23, 2004

(65) Prior Publication Data

US 2006/0060544 A1   Mar. 23, 2006

(51) Int. Cl.
*B01D 35/16* (2006.01)
*B05B 1/28* (2006.01)

(52) U.S. Cl. .................. 210/169; 210/797; 134/172; 134/182; 134/198; 239/288; 239/288.3

(58) Field of Classification Search .................... None
See application file for complete search history.

(56) References Cited

U.S. PATENT DOCUMENTS

| | | | |
|---|---|---|---|
| 1,991,638 A * | 2/1935 | Sunderman | 431/207 |
| 2,283,932 A * | 5/1942 | Jones | 266/51 |
| 2,404,590 A * | 7/1946 | Nantz | 239/288.5 |
| 2,591,198 A * | 4/1952 | Ringe | 55/294 |
| 2,928,610 A * | 3/1960 | Fenimore | 239/288.5 |
| 3,092,334 A * | 6/1963 | Peterson | 239/516 |
| 3,360,907 A * | 1/1968 | Clark, Jr. et al. | 55/283 |
| 3,498,464 A | 3/1970 | Frosolone | |
| 3,554,679 A * | 1/1971 | Brunner | 431/280 |
| 3,672,380 A * | 6/1972 | Schuster | 134/172 |
| 3,716,968 A * | 2/1973 | Mischke | 55/294 |
| 3,726,602 A * | 4/1973 | Rosocha | 401/196 |
| 3,748,678 A * | 7/1973 | Ballou | 15/24 |
| 3,764,072 A * | 10/1973 | Morehouse et al. | 239/722 |
| 3,770,204 A * | 11/1973 | Schuster | 239/288.5 |
| 3,958,296 A * | 5/1976 | Fell | 15/304 |
| 4,417,596 A | 11/1983 | Pahlen | |
| 4,668,384 A * | 5/1987 | Holman | 210/797 |
| 4,692,140 A * | 9/1987 | Olson | 604/40 |
| 4,834,883 A | 5/1989 | Lake | |
| 4,865,257 A * | 9/1989 | Bailey | 239/288.5 |
| 5,170,943 A * | 12/1992 | Artzberger | 239/532 |
| 5,292,074 A * | 3/1994 | Clark et al. | 239/546 |

(Continued)

OTHER PUBLICATIONS

Black & Decker—The Complete Guide—Maintain Your Pool & Spa; pp. 93 and 102-123; 2007.*

(Continued)

*Primary Examiner*—Robert James Popovics
(74) *Attorney, Agent, or Firm*—The Livingston Firm; Edward M. Livingston; Angela M. Miller

(57) ABSTRACT

A pool filter cleaning device (1) which allows a person to thoroughly clean a filter cartridge (15) quickly and easily with minimal amount of splash back. The pool filter cleaning device (1) is comprised of a handle (2), an angled head section (12), a shield (6) and a nozzle (8). The device (1) is attachable to standard garden hoses (3) and utilizes water pressure to clean the cartridge filter (15). The handle (2) is attached to an angled head section (12) having a preferably transparent shield (6) attached therebetween. The head section (12) is angled so as to provide a more comfortable cleaning position for a user. The shield (6) has a duel purpose as it separates the pleats (16) on the cartridge filter (15) and prevents water and debris from splashing back onto the user.

10 Claims, 2 Drawing Sheets

U.S. PATENT DOCUMENTS

| | | | | |
|---|---|---|---|---|
| 5,340,026 A | * | 8/1994 | Woodruff | 239/104 |
| 5,544,443 A | * | 8/1996 | Steglich | 47/1.5 |
| 5,565,012 A | * | 10/1996 | Buodd | 55/294 |
| 5,662,605 A | * | 9/1997 | Hurwitz | 604/514 |
| 5,735,833 A | * | 4/1998 | Olson | 604/289 |
| 5,794,855 A | * | 8/1998 | Ledford | 239/288 |
| 5,975,432 A | * | 11/1999 | Han | 239/526 |
| 5,989,419 A | * | 11/1999 | Dudley et al. | 210/167.14 |
| 6,145,756 A | * | 11/2000 | Kohls | 239/288 |
| 6,152,155 A | | 11/2000 | Milligan | |
| 6,156,213 A | * | 12/2000 | Dudley et al. | 210/791 |
| 6,209,807 B1 | | 4/2001 | Hsin-Fa | 239/600 |
| 6,210,381 B1 | * | 4/2001 | Morse | 604/289 |
| 6,463,943 B1 | | 10/2002 | Monroe | |
| 6,497,814 B1 | | 12/2002 | Alexander et al. | |
| 6,516,819 B1 | * | 2/2003 | Pearson | 134/166 R |
| 6,561,438 B1 | * | 5/2003 | Restive et al. | 239/428.5 |
| 6,679,438 B1 | * | 1/2004 | Didlo | 239/288.5 |
| 6,709,581 B2 | | 3/2004 | Leckal | |
| 6,977,040 B2 | * | 12/2005 | McCune et al. | 210/248 |
| 7,025,289 B2 | * | 4/2006 | Hubmann et al. | 239/310 |
| 7,032,838 B2 | * | 4/2006 | Fan | 239/288.5 |
| 7,063,275 B2 | * | 6/2006 | Byron | 239/288 |
| 7,132,017 B2 | * | 11/2006 | Laurence | 134/30 |
| 2002/0011259 A1 | * | 1/2002 | Pociask | 134/34 |
| 2002/0130092 A1 | * | 9/2002 | McCune et al. | 210/791 |
| 2003/0033688 A1 | | 2/2003 | McMahon | |
| 2004/0035446 A1 | * | 2/2004 | Laurence | 134/30 |
| 2004/0047675 A1 | | 3/2004 | Bonelli et al | |
| 2004/0262427 A1 | * | 12/2004 | Byron | 239/288 |

OTHER PUBLICATIONS

Three Pages from www.Filter-Wand.com. 2006.*

* cited by examiner

POOL FILTER CLEANING DEVICE

BACKGROUND OF THE INVENTION

This invention relates to pool filter cleaning devices, more specifically, a pool filter cleaning device that is simple to use, reduces the amount of time needed to clean a pool filter and prevents fluids from splashing back onto a user.

Once thought of as a recreational amenity owned and used only by affluent persons, swimming pools and jacuzzies have become a mainstream recreational amenity that is affordable and enjoyable by most anyone. Although owning and using a pool and/or jacuzzi is enjoyable, the maintenance and upkeep of the filtration system for these amenities leave much to be desired.

Most pools and jacuzzies have water filtration systems wherein the water is purified by filtering out solid debris, oils, insects and other contaminants that may enter a pool or jacuzzi. A pump is typically used wherein the water is pushed through such a filtration device so as to keep the water free of debris. A filter cartridge is the key element to most filtration systems as water passes through leaving contaminants on the outside of the filter cartridge.

A filter cartridge is a hollow, cylindrical device having many pleats. The cartridge is typically made of a paper material so as to capture the contaminants. Over time, the cartridge becomes covered with dirt, debris, oils, algae, etc. and requires cleaning. Most people typically use a hose to wash the cartridge. However, as the water from the hose is not streamlined in order to clean in between each pleat, the person cleaning the cartridge must spread the pleats apart and then aim the stream of water in between each pleat. Not only does this method take a long time to perform, it is also very messy as the water and accompanying debris "splashes back" onto the user.

Although there are some devices for cleaning filter cartridges, none are effective in separating each pleat and preventing splash back. Thus, the need for a pool filter cleaning device which thoroughly cleans in between each pleat and prevents splash back exists The relevant prior art includes the following patents:

| U.S. Pat. No. (U.S. unless stated otherwise) | Inventor | Issue Date |
| --- | --- | --- |
| 2004/0047675 | Bonelli et al. | Mar. 11, 2004 |
| 4,834,883 | Lake | May 30, 1989 |
| 6,463,943 | Monroe | Oct. 15, 2002 |
| 6,709,581 | Leckal | Mar. 23, 2004 |
| 4,417,596 | Pahlen | Nov. 29, 1983 |
| 6,152,155 | Milligan | Nov. 28, 2000 |
| 6,497,814 | Alexander et al. | Dec. 24, 2002 |
| 3,498,464 | Frosolone | Mar. 3, 1970 |
| 2003/0033688 | McMahon | Feb. 20, 2003 |

SUMMARY OF THE INVENTION

The primary object of the present invention is to provide a pool filter cleaning device that thoroughly cleans filter cartridges.

A further object of the present invention is to provide a pool filter cleaning device that separates pleats on a filter cartridge.

An even further object of the present invention is to provide a pool filter cleaning device that virtually eliminates splash back from occurring.

A further object of the present invention is to provide a pool filter cleaning device that is easy to use.

An even further object of the present invention is to provide a pool filter cleaning device that is attachable to a standard garden hose.

The present invention fulfills the above and other objects by providing a pool filter cleaning device comprised of a handle, an angled head section, a shield and a nozzle. The device is attachable to standard garden hoses and utilizes water pressure to clean the cartridge filter. The handle is attached to an angled head section having a shield attached therebetween. The head section is angled so as to provide a more comfortable cleaning position for the user. The shield has a duel purpose as it separates the pleats on the cartridge filter and prevents water and debris from splashing back onto the user. Additionally, the shield could have a filter fin spreader to further assist in the spreading of the pleats on the cartridge filter.

The above and other objects, features and advantages of the present invention should become even more readily apparent to those skilled in the art upon a reading of the following detailed description in conjunction with the drawings wherein there is shown and described illustrative embodiments of the invention.

BRIEF DESCRIPTION OF THE DRAWINGS

In the following detailed description, reference will be made to the attached drawings in which.

DESCRIPTION OF THE PREFERRED EMBODIMENTS

Figure 1:
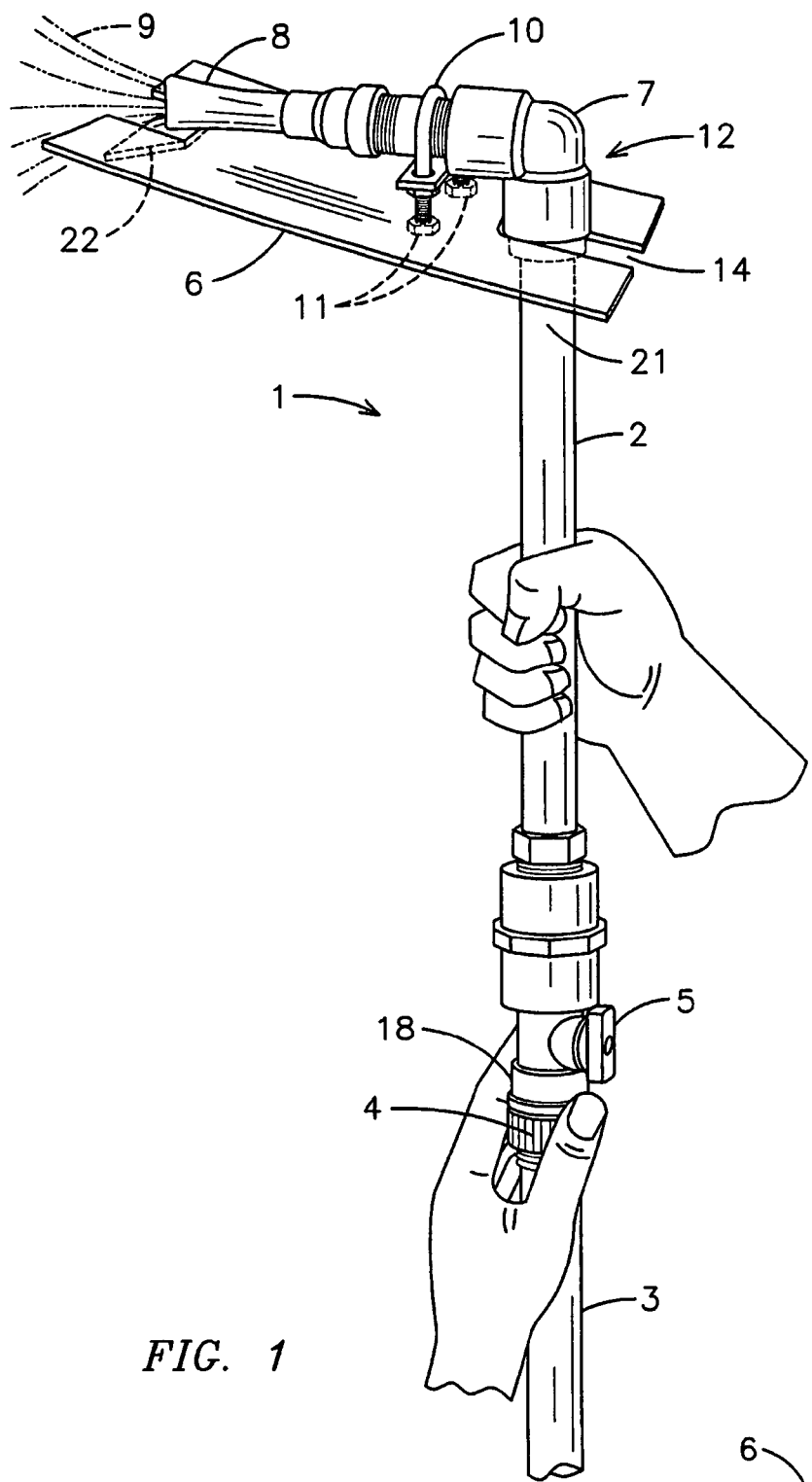
FIG. 1 is a perspective view of the present invention attached to a water hose.

For purposes of describing the preferred embodiment, the terminology used in reference to the numbered components in the drawings is as follows:

| | |
| --- | --- |
| 1. | pool filter cleaning device |
| 2. | handle |
| 3. | hose |
| 4. | means for attachment |
| 5. | on/off switch |
| 6. | shield |
| 7. | angled pipe |
| 8. | nozzle |
| 9. | water |
| 10. | securing device |
| 11. | screws |
| 12. | head section |
| 13. | washer |
| 14. | cut-out portion |
| 15. | filter cartridge |
| 16. | pleats |
| 17. | filter section |
| 18. | base of the handle |
| 19. | extension |
| 20. | threads |
| 21. | top of the handle |
| 22. | filter fin spreader |

With reference to FIG. 1, a perspective view of the present invention is shown. The pool filter cleaning device 1 has a handle 2 and a head section 12. The handle 2 is hollow and has a means for attachment 4 located at a base of the handle 18. The means for attachment 4 is preferably threaded so as to easily accept a common water hose 3.

Also located near the base of the handle 18 is an on/off switch 5. The on/off switch 5 opens/closes the water's 9 pathway to the handle 2.

The head section 12 of the present invention is comprised of an angled pipe 7 attached to a top of the handle 21, a securing device 10, a nozzle 8 and a shield 6 preferably having a filter fin spreader 22. The angled pipe 7 is hollow so as to permit water 9 from the hose 3 to pass therethrough. The securing device 10 is preferably a U-shaped clip which secures the shield 6 to the head section 12 via screws 11. The shield 6 has a cut-out portion 14 which permits the shield 6 to surround the handle 2.

Figure 2:
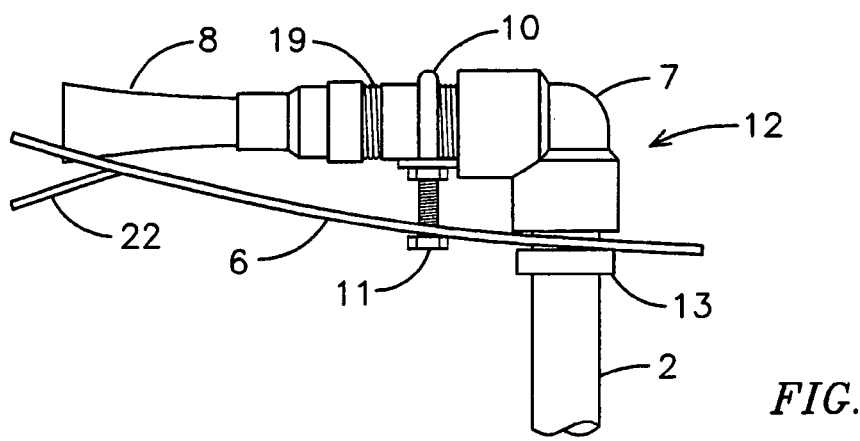
FIG. 2 is a side view of a head section of the present invention.

Referring to FIG. 2, a side view of the head section 12 of the present invention is shown. The shield 6, which is secured to the extension 19 of the angled pipe 7 by use of a securing device 10 and screws 11, is positioned between the head section 12 and the handle 2. The shield 6 is preferably curved so as to minimize splash back. A washer 13 helps prevent the shield 6 from sliding down the handle 2.

Figure 3:
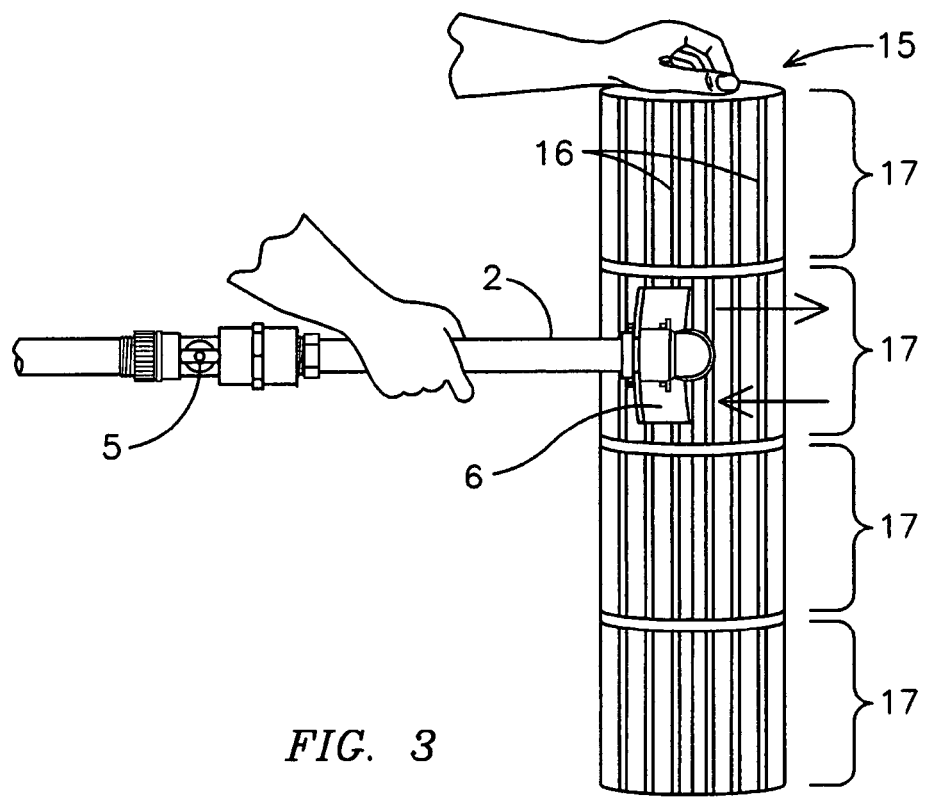
FIG. 3 is a side view of the present invention in use.

In FIG. 3, a perspective view of the present invention in use on a filter cartridge 15 is shown. To use the present invention, a user simply connects the means for attachment 4 located at the base of the handle 2 to the end of a hose 4. Then, he or she turns on the water supply. Next, the user places the filter fin spreader 22 in between the pleats 16 of a filter cartridge 15 so that the handle 2 is preferably at a 90 degree angle to the filter cartridge 15 and turns on the device via the on/off switch 5, thereby permitting a jet stream of water 9 to exit the nozzle 8 at a high rate of speed so as to clean between the pleats 16. The user then moves the pool filter cleaning device 1 in a side-to-side motion around the filter cartridge 15 so as to clean between all of the pleats 16 in a filter section 17. The user continues to clean each filter section 17 in the side-to-side manner until the filter cartridge 15 is thoroughly cleaned. Not only does the use of the shield 6 virtually eliminate splash back, but it also separates the pleats 16 to achieve a more thorough cleaning of the filter cartridge 15.

Figure 4:
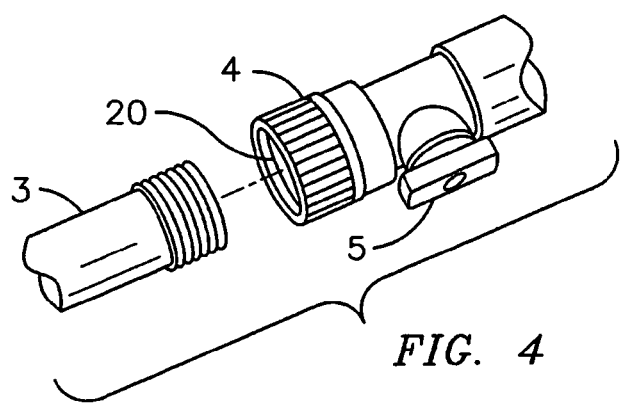
FIG. 4 is a perspective view of an attachment means of the present invention.

In FIG. 4, a perspective view of the means for attachment 4 is shown. The means for attachment 4 to a hose 3 is preferably by using threads 20 which correspond to the end of a common hose 3.

Figure 5:
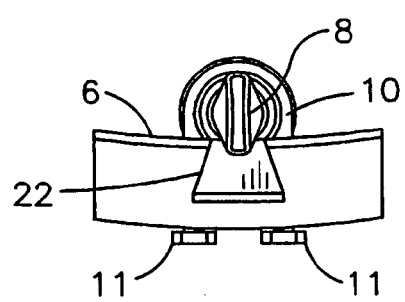
FIG. 5 is a frontal view of a nozzle of the present invention.

Finally, with reference to FIG. 5, a front view of the nozzle 8 is shown. The nozzle 8 is preferably fluted so as to ensure the water 9 exits the nozzle 8 as a flat, wide stream perpendicular to the upright filter pleats 16.

The elements of the present invention are preferably made of a plastic material to prevent corrosion. In addition, the shield 6 and filter fin spreader 22 are preferably transparent to permit a user to see which pleats 16 have been cleaned and to what degree.

The use of the present invention will allow persons to thoroughly clean a filter cartridge quickly and easily with minimal amount of splash back.

It is to be understood that while a certain form of the invention is illustrated, it is not to be limited to the specific form or arrangement of parts herein described and shown. It will be apparent to those skilled in the art that various changes may be made without departing from the scope of the invention and the invention is not be considered limited to what is shown and described in the specification and drawings.

Having thus described my invention, I claim:

1. A pool filter cleaning device comprising:
a hollow handle having a base and a top;
an angled pipe secured to said handle top;
a nozzle located on said angled pipe;
a shield having a filter fin spreader, attachable to said handle;
said shield is located beneath said nozzle; and
a means for connecting said handle to a hose.

2. The pool filter cleaning device of claim 1 wherein:
said means for connecting said handle to said hose is by threads; and
said threads correspond to threads on a water hose.

3. The pool filter cleaning device of claim 1 wherein:
said shield is transparent.

4. The pool filter cleaning device of claim 1 wherein:
said shield is curved.

5. The pool filter cleaning device of claim 1 wherein:
an on/off switch is located on said handle.

6. The pool filter cleaning device of claim 2 wherein:
said threads are located at said handle base.

7. The pool filter cleaning device of claim 1 wherein:
said shield is attached to said handle via a securing device.

8. The pool filter cleaning device of claim 7 wherein:
said securing device is a U-shaped clip.

9. The pool filter cleaning device of claim 1 wherein:
said shield has a cut-out.

10. The pool filter cleaning device of claim 1 wherein:
said nozzle is fluted.

* * * * *